United States Patent [19]

Wellington

[11] 4,380,266
[45] Apr. 19, 1983

[54] RESERVOIR-TAILORED $CO_2$-AIDED OIL RECOVERY PROCESS

[75] Inventor: Scott L. Wellington, Houston, Tex.

[73] Assignee: Shell Oil Company, Houston, Tex.

[21] Appl. No.: 243,164

[22] Filed: Mar. 12, 1981

[51] Int. Cl.$^3$ ............... E21B 43/22; E21B 47/06
[52] U.S. Cl. ............................. 166/252; 166/273; 166/274
[58] Field of Search .............. 166/252, 273, 274, 275, 166/305 R; 252/8.55 D

[56] References Cited

U.S. PATENT DOCUMENTS

| | | | |
|---|---|---|---|
| 3,084,743 | 4/1963 | West et al. ........................ | 166/273 |
| 3,342,256 | 9/1967 | Bernard et al. .................... | 166/273 |
| 3,529,668 | 9/1970 | Bernard ............................. | 166/275 X |
| 4,088,190 | 5/1978 | Fischer et al. .................... | 166/305 R X |
| 4,113,011 | 9/1978 | Bernard et al. ................... | 166/274 X |
| 4,136,738 | 1/1979 | Haynes, Jr. et al. .............. | 166/273 |

FOREIGN PATENT DOCUMENTS

823466  9/1969  Canada .......................... 166/274

*Primary Examiner*—Stephen J. Novosad
*Assistant Examiner*—George A. Suchfield

[57] ABSTRACT

An oil recovery process that utilizes an injection of $CO_2$, surfactant and water is improved by using a selected polyalkoxylated alcoholic or phenolic surfactant which is capable of forming three particular types of dispersions with the fluids in the reservoir at the reservoir conditions which are maintained during the process.

2 Claims, 8 Drawing Figures

FIG. 3
CO2 AND AQUEOUS SURFACTANT SOLUTION DISPERSED WITHIN OIL

FIG. 2
CO2 AND OIL DISPERSED WITHIN AQUEOUS SURFACTANT SOLUTION

FIG. 1
CO2 DISPERSED WITHIN AQUEOUS SURFACTANT SOLUTION

RESERVOIR-TAILORED CO₂-AIDED OIL RECOVERY PROCESS

BACKGROUND OF THE INVENTION

This invention relates to a fluid drive oil recovery process which utilizes an injection of $CO_2$, surfactant and water into subterranean oil reservoir. More particularly, the invention relates to such a process in which the surfactant selected for use is a particular member of a relatively highly chemically stable and salt-tolerant class of surfactants and is uniquely suited for use in the reservoir to be treated.

Numerous patents have been issued on materials and techniques which are pertinent to an oil recovery process that utilizes an injection of $CO_2$, surfactant and water. The U.S. Pat. Nos. 2,226,119; 2,233,381 and 2,233,382 describe polyalkoxylated alcoholic or phenolic surfactants which are generally useful in aqueous liquid fluid drive oil recovery processes. U.S. Pat. No. 2,623,596 indicates that an increased oil recovery may be obtained by a fluid drive process which injects highly pressurized $CO_2$. U.S. Pat. No. 3,065,790 indicates that, in a fluid drive process, the cost effectiveness of highly pressurized $CO_2$ may be increased by injecting a slug of the $CO_2$ ahead of a cheaper drive fluid. U.S. Pat. No. 3,330,346 indicates that almost any process for forming foam within a reservoir may be improved by using as the surfactant a polyalkoxylated alcohol sulfate of an alcohol containing 10 to 16 carbon atoms. U.S. Pat. No. 3,342,256 indicates that, in a fluid drive process, the oil-displacing efficiency of a $CO_2$ slug may be increased by including water and a foaming surfactant within that slug. U.S. Pat. No. 3,529,668 indicates that, in a fluid drive process, the efficiency of a slug of foamed $CO_2$ may be increased by displacing it with specifically proportioned alternating slugs of gas and liquid. U.S. Pat. No. 4,088,190 indicates that, in a fluid drive process, the heat stability and durability of a $CO_2$ foam may be increased by using an alkyl sulfoacetate surfactant. U.S. Pat. No. 4,113,011 indicates that in a $CO_2$ foam drive, the problems of low salt tolerance with are typical of both the surface-active sulfates of polyalkoxylated alcohols containing 10 to 16 carbon atoms recommended by U.S. Pat. No. 3,330,346 and the alkyl sulfoacetate surfactants recommended by U.S. Pat. No. 4,088,190 may be avoided by using a surfactant sulfate of a polyalkoxy alcohol containing only 8 or 9 carbon atoms and injecting that surfactant ahead of the $CO_2$.

SUMMARY OF THE INVENTION

The present invention relates to a $CO_2$ and aqueous surfactant-enhanced fluid drive process for displacing oil within and/or recovering oil from an oil and brine-containing subterranean reservoir that is capable of confining fluid at a pressure at which $CO_2$ is at least substantially liquid.

First, a selection is made of a polyalkoxy alcoholic or phenolic surfactant. The selected surfactant is one which exhibits certain properties when (a) it is mixed with an oil and brine having physical and chemical properties which are at least substantially equivalent to those of the reservoir oil and brine and (b) the mixing is conducted at substantially the reservoir temperature and a pressure at which $CO_2$ is at least substantially liquid. In such a situation the selected surfactant is capable of forming substantially uniform and relatively stable homogenous dispersions of each of the following types: (1) $CO_2$ dispersed within a solution of surfactant in brine, (2) $CO_2$ and oil dispersed within a solution of surfactant to brine and (3) $CO_2$ and a solution of surfactant in brine dispersed within oil.

Second, fluid is circulated between injection and production locations within the reservoir at a rate providing both a pressure which at least substantially liquifies $CO_2$ and a suitable rate of flow where the mobility of the fluid at least substantially equals that of the reservoir brine.

Third, while maintaining substantially the same rate of circulation, portions of the selected surfactant, portions of $CO_2$ and portions of a brine having physical and chemical properties at least substantially equivalent to those of the reservoir brine are included within the inflowing fluid. The sequence and volumes of those portions are arranged so that before, or at least soon after entering the reservoir, the $CO_2$ is substantially homogeneously dispersed within a solution of surfactant in brine.

Fourth, the injection of the $CO_2$, surfactant and brine is continued until the volume of the resultant dispersion of $CO_2$ within a solution of surfactant in brine is at least sufficient to form a bank large enough to be capable of remaining substantially intact throughout its displacement between the injection and production locations within the reservoir.

And, the circulation of fluid between the injection and production locations within the reservoir is continued to displace oil into the production location.

DESCRIPTION OF THE INVENTION

As indicated by the above references it was heretofore believed that, in a $CO_2$ and aqueous surfactant-enhanced foam drive process for recovering oil, various types of surfactants or procedures should be used. For example, in order to avoid problems due to an inadequate insensitivity of the foam to the reservoir pressure or temperature, or to $CO_2$-induced acidity, or to the reservoir brine salinity, or to the long duration of the process, or the like, the surfactant should be a sulfate of a polyalkoxylated alcohol containing 8 or 9 carbon atoms and should be injected as an aqueous solution that precedes the $CO_2$. But, such alcohol sulfate surfactants are known to be relatively chemically unstable within water-containing subterranean reservoirs having temperatures as high as 150° F. At such temperatures those surfactants are relatively rapidly hydrolyzed into alcohols and acids that have much less surface-activity.

It has now been discovered that, for a particular reservoir and the physical and chemical properties of the oil and brine that it contains, by the presently described procedure, a surfactant which is uniquely adapted for use in that reservoir can be selected from a much more hydrolysis-resistant class of surfactants. Such a surfactant is a polyalkoxylated alcoholic or phenolic surfactant which is capable of forming the above-specified three types of substantially homogeneous dispersions in contact with the reservoir fluids and substantially liquified $CO_2$ at the reservoir temperature and pressure.

Advantageously, the chemical stability of any surfactant which is so-selected is significantly greater than that of commercially available alcohol sulfate types of surfactants. In addition, the so-selected surfactants tend to be equally surface-active when they are dissolved at economically low concentrations within brines having salinities ranging all the way from those of substantially fresh water to those of substantially saturated solutions of salt. And, the so-selected surfactants have adsorptivities on reservoir rocks which are low relative to those of the chemically stable anionic surfactants such as the petroleum sulfanote surfactants.

Unobviously, when a surfactant which is selected as presently specified is injected so that it forms a dispersion of $CO_2$ within a solution of surfactant in brine before or soon after entering the reservoir, that procedure makes it possible to attain and maintain a selected pressure gradient within the zone through which the $CO_2$ is being displaced. Such a selected pressure gradient can range from a value substantially equalling that produced by injecting the $CO_2$-free brine to a value of from about 2 to 200 times greater. And, during an oil recovery operation, the magnitude of the pressure gradient can be varied by relatively minor adjustments in the concentrations and/or proportions of the components of the fluids being injected.

Figure 1:
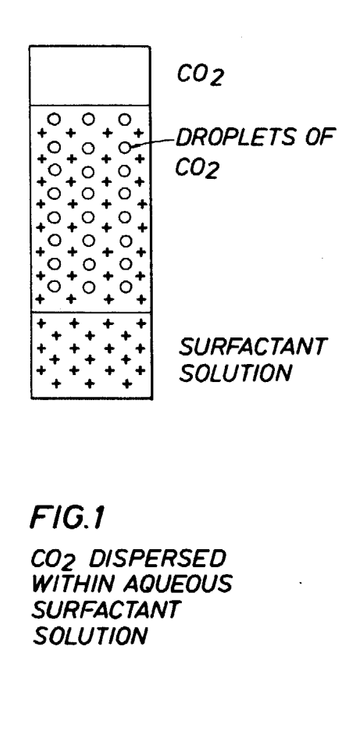
FIGS. 1, 2 and 3 are schematic illustrations of the appearances of the indicated types of dispersions.
Figure 2:
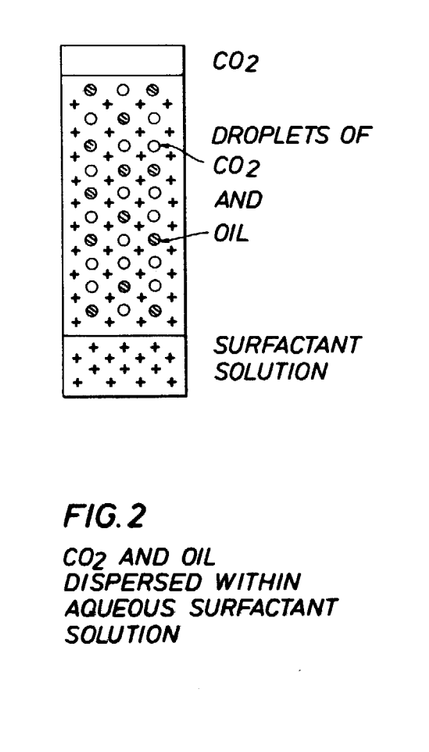
Figure 3:
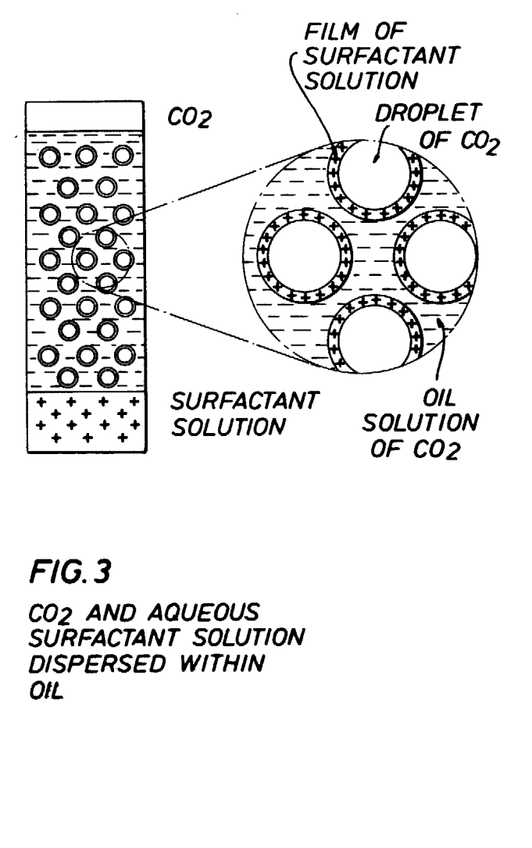

FIGS. 1 to 3 are schematic illustrations of the appearance of each of the three types of dispersions which can be formed by a surfactant which is suitable for use in the present process (when that surfactant is in contact with the fluids to be encountered in the reservoir at the reservoir conditions). The appearances of such dispersions are readily observable in high pressure sight glasses such as those of a Daniel High Pressure Gauge with see-through glass on both sides to permit the observation of interfaces between immiscible fluids.

Sight cell tests of the following type are particularly suitable for determining whether a particular polyalkoxy alcoholic or phenolic surfactant is suitable for a particular reservoir. A sight cell and its contents are maintained at substantially the pressure and temperature to be employed within the reservoir. A solution of the surfactant and the brine to be used is introduced into the sight cell. The brine used should be a portion of the water currently present in the reservoir to be treated or a water of substantially equivalent salinity. The $CO_2$ and oil to be used can be introduced into the sight cell in any order and should be the same as or equivalent to such fluids to be injected into or encountered within the reservoir.

FIGS. 1-3 show the appearances of the dispersion produced while selecting a surfactant for use in the Wasson reservoir at a temperature of from about 100° to 110° F. and a pressure of from about 900 to 3000 psi. The sight cell was pressurized with mercury using a hand-operated pressure intensifier. Pressure measurements were made using a calibrated Heise Bourdon Tube Gauge. Coleman grade $CO_2$ was supplied to the cell from commercial cylinders. The brine used (with or without dissolved surfactant) was a synthetic Wasson injection water (SWIW) and the oil used was Wasson crude oil. The chemical and physical properties of those fluids are listed in Tables 1 and 2.

TABLE 1

COMPOSITION OF SYNTHETIC WASSON INJECTION WATER (SWIW)

| Cations | Mg/liter |
|---|---|
| $Na^+$ | 75.9 |
| $Ca^{++}$ | 78.0 |
| $Mg^{++}$ | 26.1 |
| $Cl^-$ | 138.3 |
| $HCO_3^-$ | 201.3 |
| $CO_4^=$ | 83.9 |

TABLE 2

WASSON CRUDE OIL (WCO) VOLATILITY DISTRIBUTION

| Carbon Number | B.P., °C. at 760 mm | Weight Percent |
|---|---|---|
| 4 | 0.5 | 0.8 |
| 5 | 36.1 | 1.5 |
| 6 | 68.7 | 2.4 |
| 7 | 98.4 | 5.2 |
| 8 | 125.7 | 7.0 |
| 9 | 150.8 | 6.6 |
| 10 | 174.1 | 5.3 |
| 11 | 195.9 | 4.6 |
| 12 | 216.3 | 4.1 |
| 13 | 235.4 | 4.1 |
| 14 | 253.6 | 3.8 |
| 15 | 270.6 | 3.5 |
| 16 | 286.8 | 3.0 |
| 17 | 301.8 | 3.1 |
| 18 | 316.1 | 2.8 |
| 19 | 329.7 | 2.4 |
| 20 | 342.7 | 2.1 |
| 21 | 355.6 | 1.9 |
| 22 | 367.6 | 1.8 |
| 23 | 379.0 | 1.6 |
| 24 | 389.9 | 1.4 |
| 25 | 400.4 | 1.3 |
| 26 | 410.5 | 1.2 |
| 27 | 420.2 | 1.2 |
| 28 | 429.6 | 1.2 |
| 29 | 438.6 | 1.0 |
| 30 | 447.3 | 1.0 |
| 31 | 456.0 | 0.9 |
| 32 | 464.0 | 0.8 |
| 33 | 472.0 | 0.8 |
| 34 | 479.0 | 0.7 |

Measured amounts of the brine and/or surfactant solution in brine were injected into the cell with a syringe. The cell was then pressurized with a selected amount of $CO_2$ and allowed to attain temperature equilibrium. After an equilibration period of about 30 minutes the cell was rocked back and forth to mix its contents.

In a so-charged cell, the brine and $CO_2$ appear transparent. When the $CO_2$ is contacted with crude oil its color changes from transparent to yellow to tan to brown to black (if the oil is black) as more and more heavy components of the oil dissolve in the $CO_2$. However, in the preferred surfactant-identifying test procedure, since a single contact is used between the $CO_2$ and oil, the color of the $CO_2$ is seldom changed beyond very slightly yellow. Where the oil used is a refined oil, such as Soltrol, the $CO_2$ remains transparent.

FIG. 1 shows the appearance of a relatively stable and homogeneous dispersion of $CO_2$ in brine in the absence of oil. In testing such dispersion the cell is preferably charged with substantially equal volumes of the $CO_2$ and surfactant solution. Most polyalkoxylated alcoholic or phenolic surfactants are capable of forming such dispersions in most (but not all) brines. However, in the present process, it is important that such a dispersion be formed before or soon after the components enter the reservoir and little or no oil may be present in the near well portion of the reservoir. It is therefore important to be sure that the mixtures are substantially homogeneous in the proportions which are apt to be used or encountered within the reservoir.

In such sight cell tests, dispersions of the substantially liquified $CO_2$ within either a brine or a solution of surfactant in the brine have the appearance of a foam—in spite of the fact that, in many respects, the so-dispersed $CO_2$ is more like a dispersed liquid than a dispersed gas. In general, it is suitable to consider dispersions which break within less than about 30 minutes to be unstable and to select as suitable those which last significantly longer. Of course, within the unobstructed internal volume of the sight cell, a small portion of fluids which are less dense or more dense than such a dispersion tend to be segregated above and below a layer of the dispersion. The brine is usually the most dense fluid, the $CO_2$ is the least dense and the oil usually has a density between those of the brine and the $CO_2$.

FIG. 2 shows the appearance of a suitably stable and homogeneous dispersion of $CO_2$ and oil within a solution of surfactant in brine. In such tests, the cell is preferably charged with substantially equal parts by volume of the $CO_2$ and the surfactant solution in brine plus a smaller proportion, such as from about 1 to 30 parts by volume, of the oil. The oil tends to exert a significant dibilitating effect on the stability of such dispersions. Numerous surfactants which form stable dispersions of the type shown in FIG. 1 fail to form those of the type shown in FIG. 2—even when the proportion of oil is relatively small. Examples of such failures are shown in Table 3.

TABLE 3

Commercially available surfactants which formed suitable dispersions of $CO_2$ within a solution of surfactant in brine; but not of $CO_2$ and oil within a solution of surfactant in brine.

| Product Name | Composition |
| --- | --- |
| Pluronic L 61 | Block polymers of polyoxethylene |
| Pluronic L 92 | and polyoxypropylene groups |
| Petronate-L | Sodium salts of petroleum sulfonates |
| Hexadecylbrimethylammonium bromide | -as named- |
| Neodol 25 | 12-15 carbon atom aliphatic alcohols |
| Saponin | Amorphous glycosides |
| Triton X-45 | Ethoxylated isoctylphenol, with 5 EO groups |
| Naphthenyl alcohol | -as named- |

FIG. 3 shows the appearance of a suitably stable and homogeneous dispersion of both $CO_2$ and a solution of surfactant in brine dispersed within oil. In these tests, the sight cell is preferably charged with substantially equal volumes of $CO_2$ and the surfactant solution plus a volume of oil exceeding the total volume of $CO_2$ and surfactant solution. This is a particularly stringent test involving the formation of a unique type of dispersion. The illustrated detail of the arrangement of films and droplets is, of course, speculative. However, such an arrangement appears to be consistent with the performance exhibited in numerous laboratory tests of oil recovery processes.

Table 4 lists typical commercially available surfactant materials which formed good, fair or poor dispersions of both $CO_2$ and surfactant solution within oil. The composition of the brine used in most of those tests was 23.98 grams sodium sulfate, 4.78 grams calcium sulfate and 0.8 grams strontium sulfate per liter of distilled water.

TABLE 4

Commercially available surfactants which formed suitable dispersions of both $CO_2$ and solution of surfactant in brine dispersed within oil.

| Product Name | Rating* | Compositions |
| --- | --- | --- |
| Neodol 25-9 | G | Ethoxylated 12-15 C-atom aliphatic alcohols with 9 EO groups |
| Pluronic L 64 | G | Block polymers of polyoxyethylene and polyoxypropylene groups |
| Pluronic L 44 | F | Block polymers of polyoxyethylene and polyoxypropylene groups |
| Triton X-100 | F (except in very saline brine) | Polyethoxylated octylphenol |
| Polytergent SL-62 | F (finely dispersed) | Condensation product of ethylene and propylene oxides |
| Neodol 25-7 | F | Ethoxylated 12-15 C-atom aliphatic alochols with 7 EO groups |
| Neodol 25-3S** | P (too weak) | A sulfate of ethoxylated 12-15 C-atom aliphatic alcohols with 3 EO groups |
| Neodol 25-3 | P (too weak) | (As above; not sulfated) |
| Alipal CD-128** | P (too weak) | Ammonium salt of a sulfated linear primary alcohol ethoxylate |

*G = Good;
F = Fair;
P = Poor
**An anionic surfactant (of significantly less chemical stability; for comparison).

One particularly unobvious and important feature of the present process is the fact that the relative mobilities or effective viscosities of the dispersions of the types shown in FIGS. 1, 2 and 3 tend to be substantially equal within permeable earth formations. Substantially no differences have been detectable in tests such as displacing such dispersions through cores of reservoir formations while monitoring the pressure required to maintain a given rate of flow or measuring falling times and/or falling rates of a ball within a sight cell containing such dispersions, etc.

Figure 4:
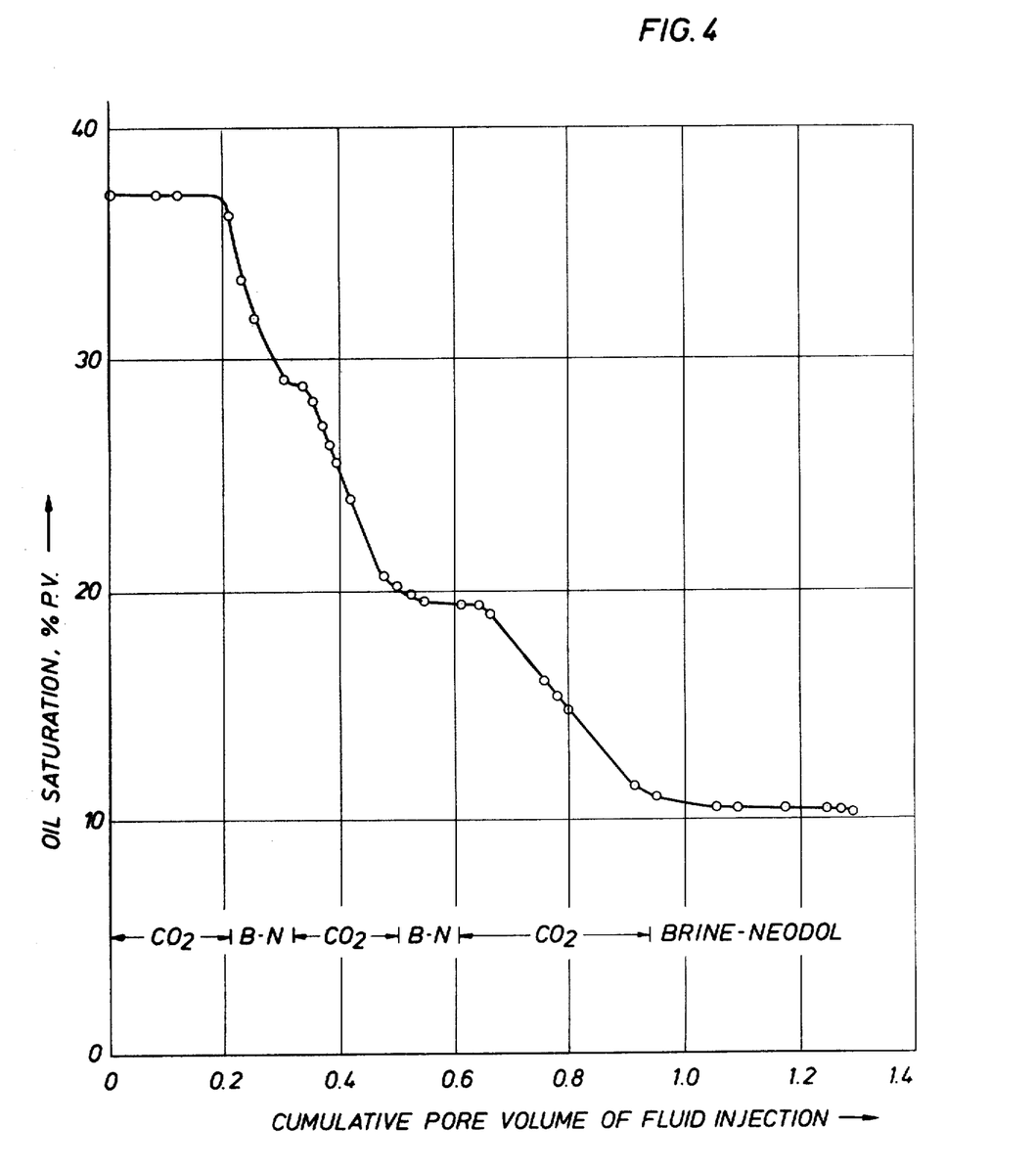
FIGS. 4–6 are illustrations of graphs of oil saturation with amount of fluid injected into oil-containing cores of earth formation.
Figure 5:
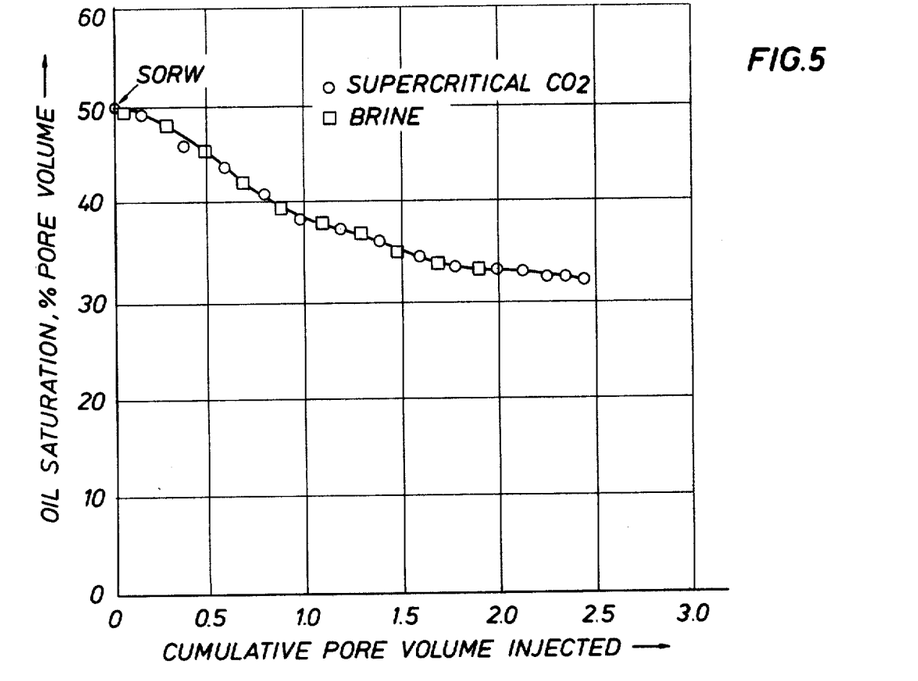
Figure 6:
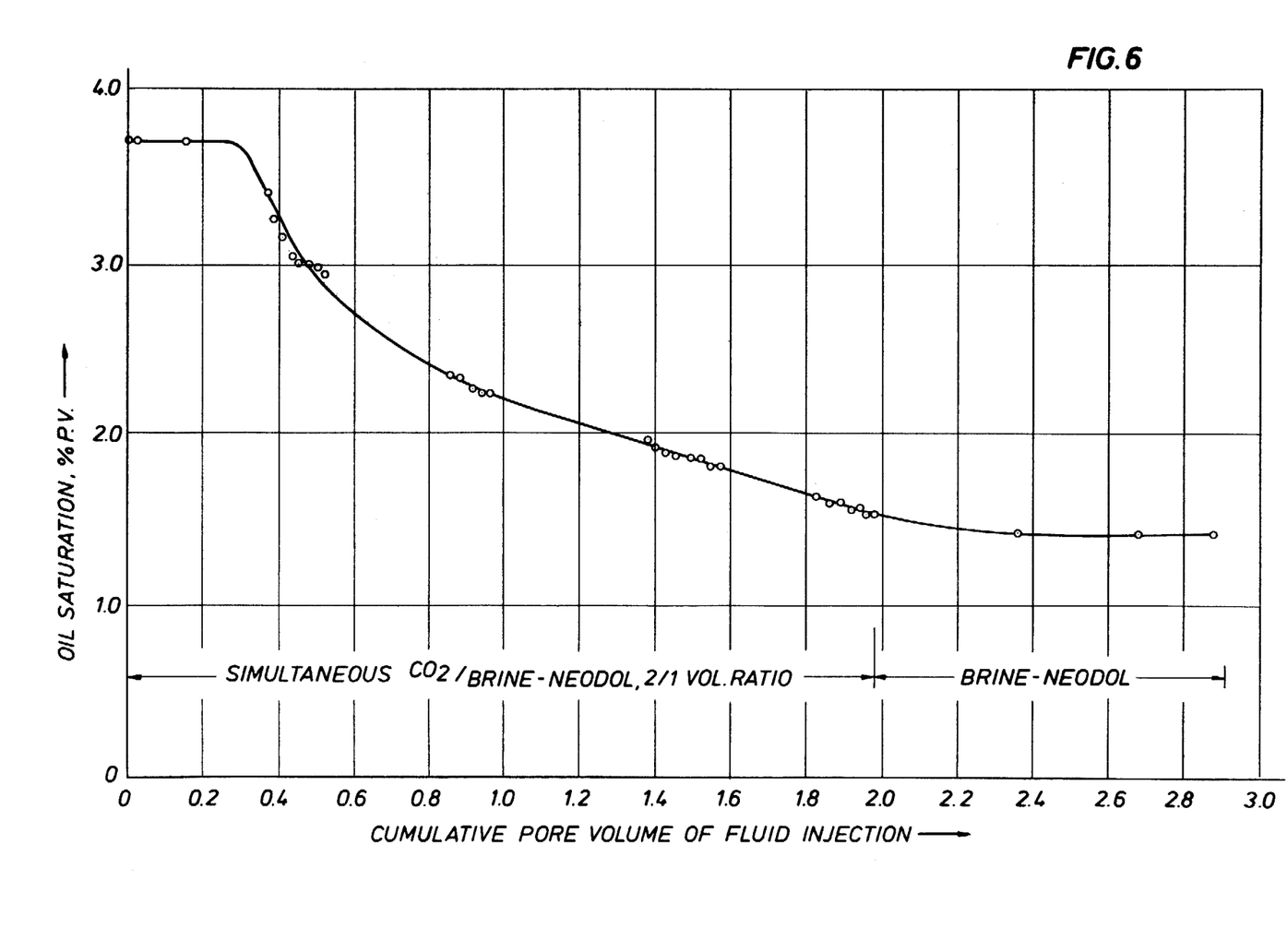

FIGS. 4-6 show typical results obtained by core flooding tests with various combinations of $CO_2$, brine and brine solution of surfactant. In most of the tests the cores were San Andres outcrop rock three inches in diameter and ten inches long. Flow rates varied from about one-quarter foot per day to about four feet per day. The temperature was maintained at about 105° F. and a back pressure regulator was utilized to maintain a pressure of about 2000 psig within the cores.

FIG. 4 shows the results of alternate injection of 0.2 PV (pore volume) $CO_2$, 0.1 PV brine, 0.2 PV $CO_2$, 0.1 PV brine, 0.3 PV $CO_2$ and 0.3 PV brine where the brine was a SWIW (See Table 1) solution containing 0.1% by weight of Neodol 25-9 surfactant. As indicated in the figure, the first 0.2 PV injection of $CO_2$ made little reduction in the initial oil saturation of about 37%. The injection of the first 0.1 PV slug of the brine solution caused the significant drop, the rate of drop and oil saturation declined again during the injection of the second 0.2 PV slug of $CO_2$ and so on with the residual oil saturation being reduced to about 11% during the injection of about 1 pore volume of fluid of which 0.7 pore volume was $CO_2$.

FIG. 5 shows the results of a similar core flood in which 0.1 PV slugs of a similar brine free of surfactant were alternated with 0.1 PV slugs of the $CO_2$. Although the flow rate used in the flood shown in FIG. 1 was only one-quarter foot per day while that in FIG. 5 was four foot per day, it is apparent that there was a much lower rate of oil recovery in the latter process and a much less efficient utilization of the $CO_2$.

FIG. 6 shows a similar flood using a simultaneous injection of $CO_2$ and a SWIW solution containing 0.1% by weight of Neodol 25-9 surfactant, in a ratio of 2 volumes of the $CO_2$ per volume of the brine. In this case, the flood rate was 0.9 foot per day. It is apparent that this provided a material increase over the similar alternation of $CO_2$ and surfactant-free brine slugs of FIG. 5 but provided a slower rate of oil recovery and less efficient use of the $CO_2$ than that shown in FIG. 4. The slower rate of oil recovery shown in FIG. 6 versus that shown in FIG. 4 is mainly due to the simultaneous injection of brine that shields the $CO_2$ from directly contacting and displacing the residual oil.

A particularly important aspect to the present invention is a capability of adjusting the pressure gradient between the injection and production locations within a reservoir by relatively simple changes in the composition variables such as the ratio of surfactant to brine, the ratio of $CO_2$ to brine and/or the sequencing of such fluids. By means of such changes, the pressure gradient can readily be adjusted to a value from about 2 to 100 times higher than that for the injection of the brine alone (where the brine salinity is substantially equal to that of the water in the swept zone of the reservoir). In general, the pressure gradient declines during an injection of $CO_2$ and increases during an injection of the surfactant in brine solution, and also increases with the concentration of the surfactant in that solution.

In general, where the $CO_2$ and the solution of surfactant in brine are not mixed prior to their entry into the reservoir the sizes of the slugs of the alternate gas and liquid components should be not more than about 40% of a volume sufficient to form a bank which will remain intact while being displaced from the injection to the production locations within the reservoir. As known to those skilled in the art, the volumes required for such banks are different for different reservoirs but can be estimated by known procedures with reasonable accuracy. For example, laboratory tests have shown that injecting a volume amounting to about 0.3 PV of a core being flooded of a solution of the SWIW brine containing 0.1% Neodol 25-9 (prior to a continuous injection of the $CO_2$) provided a pressure gradient nearly equalling that required to inject the brine at a typical selected rate for about the first 0.35 PV of the subsequent $CO_2$ injection. After that, the injection pressure declined and was reduced to only about one half to one third of that required (for the selected flow rate with the brine) by the time the amount of $CO_2$ injected was about 0.5 PV.

In injecting alternating fluids, such as $CO_2$ and aqueous brine, using slugs smaller than about 30% of the volume needed to maintain at intact bank, or using smaller slugs, or a pre-mixing of such fluids, at least with respect to the substantially radial flow geometry within a reservoir being flooded, tends to ensure that the injected portions of the $CO_2$ and brine are substantially homogeneously mixed before or soon after they enter the reservoir. In a particularly preferred procedure it is advantageous to initially inject a sequence of at least one each of slugs of volumes amounting to about 20-30% of that needed for an intact bank of, respectively, surfactant-containing brine and $CO_2$ prior to an injection of an alternating sequence of smaller slugs or a simultaneous flow of those fluids to provide the additional volume needed for an intact bank. The bank can then be displaced with a cheaper drive fluid.

In the present process the attaining of such a homogeneous mixing near the injection well is particularly advantageous. It enables the operator to select and maintain a pressure gradient to be applied in order to provide a selected rate of flow between the injection and production locations. The selection can be made, for example, by measuring the injection pressure required to maintain that rate of flow of brine or, alternatively, the rate of brine injection required to maintain a selected pressure gradient. By monitoring such quantities the operator can be alerted substantially as soon as the bank of $CO_2$ foam (or foamulsion or mixture of $CO_2$ and liquid) which provides a relatively low mobility moves into or encounters a thief zone, such as a high permeability streak through which the fluid can flow faster at the same gradient. Such an encountering of a thief zone will cause a relatively quick alteration in the pressure and/or rate required to maintain the selected flow rate or gradient. By altering the composition of the inflowing fluid, the operator can significantly decrease the mobility of that fluid to the extent required to maintain the average flow rate or gradient at the selected value.

Figure 7:
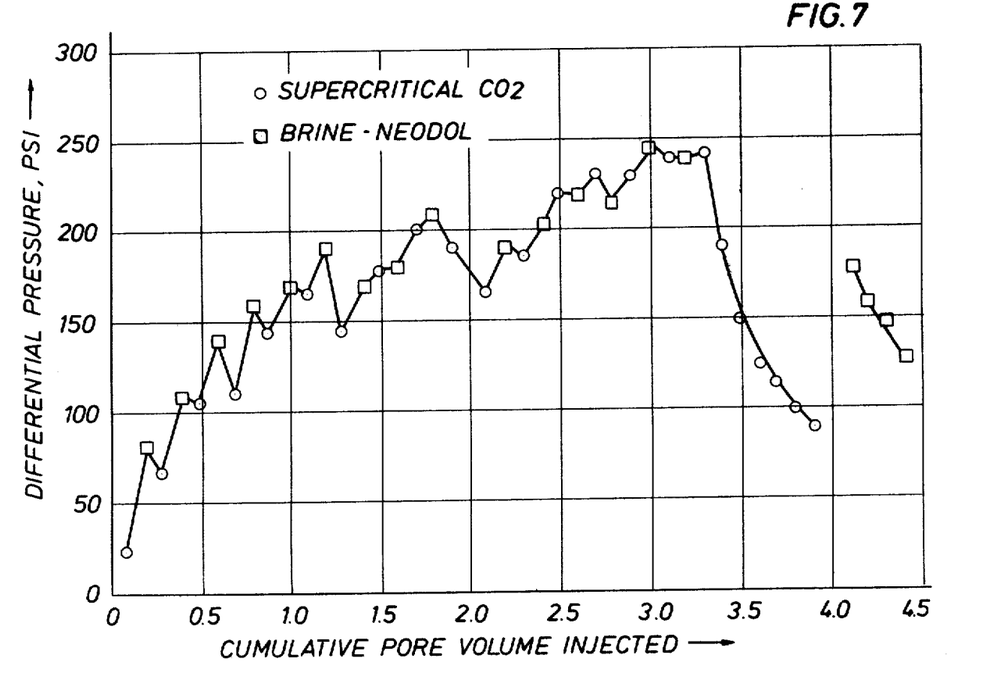

FIG. 7 shows a plot of the variation in differential pressure with cumulative core volume of fluid injected in a typical core flooding experiment. The typical cores were cylinders 25.4 cm. long and 7.5 cm. in diameter, from a San Andres outcrop rock.

The core used in FIG. 7 had a brine permeability of 5.3 millidarcys, a porosity of 12.5%, a pore volume of 138.1 ml and the residual oil saturation after water flood of 43.0% pore volume. In the illustrated experiment, the oil used was Soltrol 130, a light kerosene which is completely miscible with $CO_2$ at the Wasson reservoir temperature and pressure. The brine used contained 0.1% Neodol 25-9 surfactant. The temperature was maintained at 105° F., (41° C.). The fluids were injected against the back pressure of 2,000 psi. $CO_2$ breakthrough was detected by a direct observation of the fluids. The pressure differentials were measured across the length of the core. Typical results of such experiments indicate that foams or dispersions of substantially liquid $CO_2$ are formed near the inlet base and are propagated through the core without plugging. The $CO_2$ breakthrough was retarded significantly, generally by about 0.2 to 0.3 pore volume. The final oil saturation was reduced to less than about 15% pore volume, which is comparable with the reduction obtainable by continuous injection of a significantly larger portion of $CO_2$ without injecting any surfactant containing brine.

Figure 8:
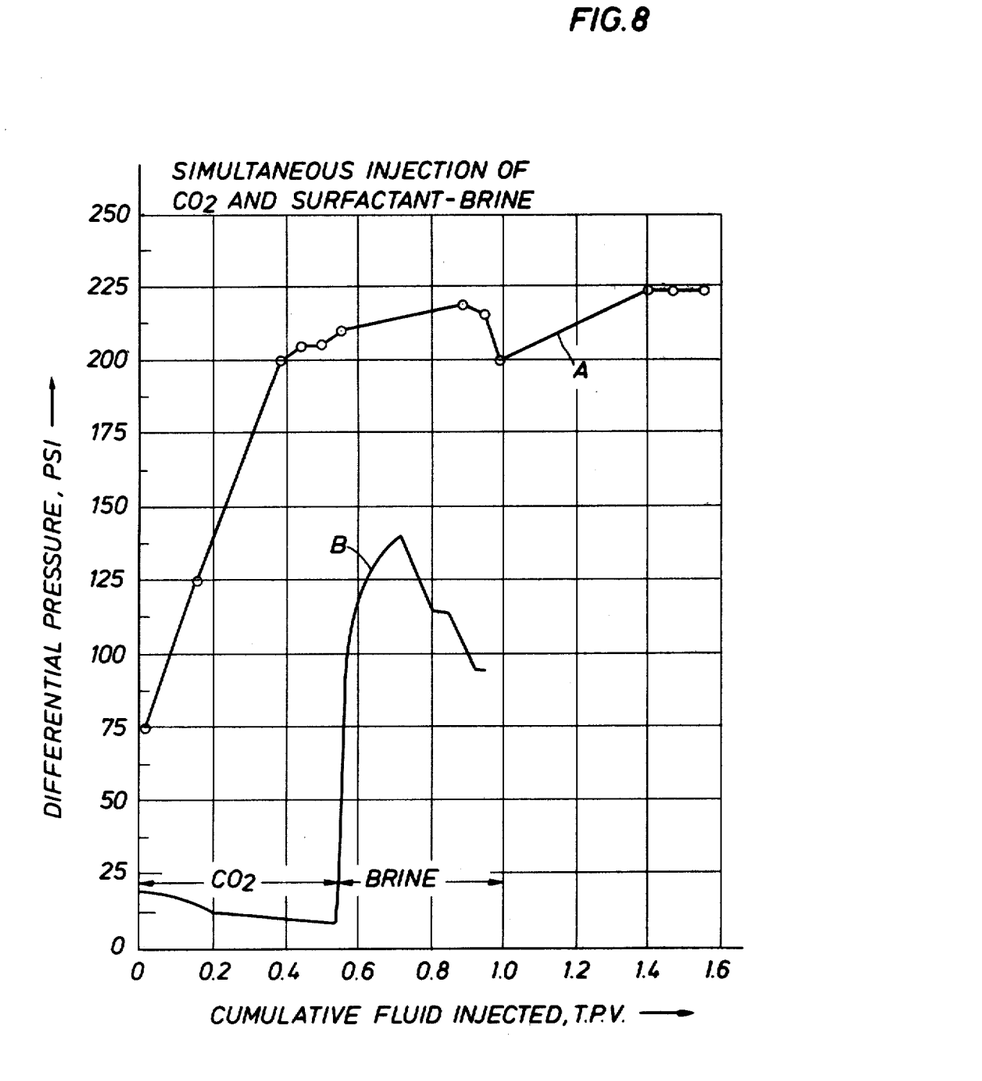

FIG. 8 shows the variation in differential pressure with cumulative amount of fluid injected in similar flooding experiments with San Andres outcrop rock cores, which were one inch in diameter and 22 to 25 inches long. Those cores were wrapped with Teflon tape, rolled in aluminum foil, enclosed in shrink-fit Teflon tubing between stainless steel core holder end pieces, inserted into a rubber sleeve and put into a triaxial core holder. The loaded core holder was mounted horizontally in a constant temperature bath and evacuated. The core was then saturated and its brine permeability determined. The core was oil flooded at 10 feet per day to an initial oil saturation after which brine was injected at 10 feet per day to establish a water flood residual oil saturation.

After reducing the flood rate to one-quarter foot per day, the back-pressure was adjusted to about 2,000 psi.

Curve A relates to the simultaneous injection of $CO_2$ and brine containing 0.1% Neodol 25-9 surfactant in a volume ratio of 2 to 1. The rate of the combined volume entry flow of the two phases was 0.9 foot per day. The oil recovery was comparable to the best obtainable by continuous $CO_2$ injection and also to that obtained in a prior experiment in which the simultaneous injection of $CO_2$ and brine was preceded by a pre-injection of 0.3 PV of brine containing 0.5% Neodol (after injecting only 0.74 PV of $CO_2$). In the test represented by Curve A, however, 1.4 PV of $CO_2$ was required to obtain the same percent of oil production.

Those comparative tests indicate the desirability of injecting at least one pair of sequential slugs of surfactant containing brine and $CO_2$ having pore volumes in the order of 0.2 to 0.3 before initiating a substantially simultaneous injection of the $CO_2$ and surfactant containing brine. As shown by Curve A, the differential pressure climbed above 200 psi in about 0.4 PV cumulative injection and continued at a high level throughout 1.4 PV.

In contrast, Curve B shows the pressure behavior which is typical for injections of $CO_2$ and surfactant-free brine. The pressure gradient was gradually reduced during the injection of slightly more than 0.5 PV of $CO_2$. The injection of brine caused a sharp initial increase in the pressure gradient during the injection of first 0.1 pore volume of brine but was followed by an immediate decrease in that gradient during the injection of the next 0.2 PV.

What is claimed is:

1. A process for formulating and injecting a $CO_2$-containing fluid for displacing oil within an oil and brine-containing subterranean reservoir comprising:

determining the reservoir temperature and properties of the oil and brine contained within the reservoir;

selecting a surfactant which both consists essentially of at least one polyalkoxyalcoholic surfactant and is capable of inducing the formation of substantially homogeneous dispersions of each of the specified types when said surfactant is mixed with the specified fluids at the reservoir temperature and a pressure of at least about 2000 psi at which $CO_2$ is substantially liquid at the reservoir temperature;

said types of dispersions being (1) $CO_2$ dispersed in a solution of surfactant dissolved in brine having a salinity substantially equivalent to that of the brine in the reservoir, when the volumes of the $CO_2$ and aqueous liquid are substantially equal and the mixture is substantially free of oil, (2) $CO_2$ and oil having properties at least substantially equivalent to those of the reservoir oil dispersed in a solution of the same surfactant in brine where the volume of oil is smaller than the total volume of $CO_2$ and brine, and (3) $CO_2$ and a solution of the same surfactant in brine dispersed in the same oil where the volume of oil exceeds the total volume of $CO_2$ and brine; and injecting into the reservoir, at a pressure greater than about 2000 psi at which the $CO_2$ is substantially liquid at the reservoir temperature, $CO_2$, the selected surfactant, and a brine having a salinity at least substantially equivalent to that of the brine in the reservoir, in a sequence and proportion such that before, or soon after, entering the reservoir (a) the $CO_2$ is initially dispersed in a solution of the surfactant in brine, (b) advancing portions of the initial dispersion are converted to a dispersion of $CO_2$ and the reservoir oil in the solution of surfactant in brine, and (c) advancing portions of the latter dispersion are converted to a dispersion of $CO_2$ and a solution of surfactant in brine in the reservoir oil.

2. The process of claim 1 in which the brine present in the reservoir contains at least about 600 parts per million total dissolved salts and the selected surfactant consists essentially of a mixture of ethoxylated 12 to 15 carbon atom aliphatic alcohols containing an average of about 9 ethoxy groups per molecule.

* * * * *